July 7, 1925.
A. C. WOODRUFF
DIRIGIBLE HEADLIGHT
Filed April 15, 1924
1,545,179
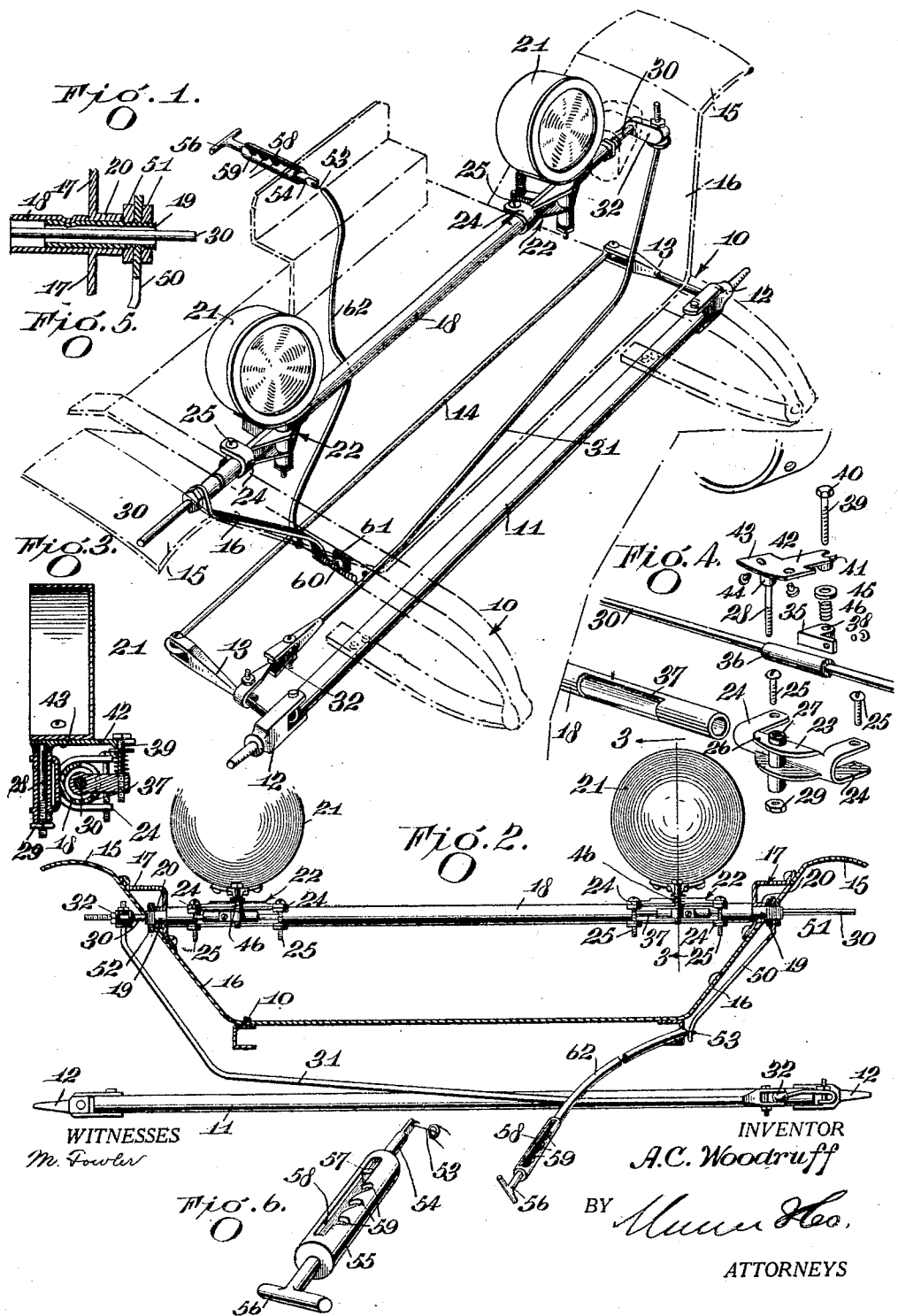
WITNESSES
M. Fowler
INVENTOR
A.C. Woodruff
BY
ATTORNEYS Patented July 7, 1925.

1,545,179

UNITED STATES PATENT OFFICE.

ALVIE C. WOODRUFF, OF PORTLAND, OREGON.

DIRIGIBLE HEADLIGHT.

Application filed April 15, 1924. Serial No. 706,754.

*To all whom it may concern:*

Be it known that I, ALVIE C. WOODRUFF, a citizen of the United States, and a resident of Portland, in the county of Multnomah and State of Oregon, have invented certain new and useful Improvements in Dirigible Headlights, of which the following is a specification.

This invention relates to dirigible headlights.

The object of the invention is to provide a simplified and entirely practical dirigible headlight structure in which the headlights may be controlled automatically so as to follow the turning movements of the vehicle, and in which the headlights may also be controlled if desired to vary the inclination of the beams projected from the headlights to avoid subjecting the drivers of approaching vehicles to the full glare and intensity of beams.

Another object is to provide a dirigible headlight of this character and having these advantages and capacities and which is also well adapted for organization with the conventional automobile construction, the dirigible headlights and their controls serving to strengthen and enhance the structure of the automobile and to better the appearance thereof.

Other objects and advantages of the invention reside in certain novel features of the construction combination and arrangement of parts which will be hereinafter more fully described and particularly pointed out in the appended claims, reference being had to the accompanying drawings forming part of this specification, and in which:

Figure 1 is a fragmentary perspective view, showing one embodiment of the invention;

Figure 2 is a view in vertical section, taken just behind the headlights and looking forwardly of the vehicle;

Figure 3 is a view in vertical section, taken on line 3—3 of Figure 2;

Figure 4 is a group view in perspective, showing a supporting device for the headlights and a motion transmission mechanism between a headlight and the operating rod;

Figure 5 is a detail view in section on line 5—5 of Figure 2; and

Figure 6 is a detail view in perspective, showing the manually operable control for swinging the headlights about their horizontal axes in rotation.

Referring to the drawings, the numeral 10 designates generally an automobile having a front axle 11 provided at its ends with stub axles 12 adapted to connect to the front steering wheels of the vehicle in the usual manner. The stub axles 12 are provided with arms 13 connected to each other by a tie rod 14 in the usual manner. The vehicle may also include front fenders 15 having aprons 16.

A dirigible headlight assembly constituting my invention includes a pair of bearing brackets 17 suitably fastened to the aprons 16 of the front fenders 15, the members of the pair of bearing brackets 17 being opposite each other. A tubular supporting shaft 18 is provided, and in the open ends of the shaft 18 bearing bushings 19 are fitted and secured. These bushings 19 are rotatably mounted in bearing sleeves 20 of the bearing brackets 17, and in this manner the shaft 18 is rotatably mounted on the bearing brackets.

A pair of headlights, designated at 21, is mounted on the shaft 18. A separate supporting device, designated at 22 is provided for each headlight but as these supporting devices are of identical construction a single description will serve for both. Each supporting device includes a bracket 23 having resilient clamps 24 designed to embrace the shaft 18 and to be clamped thereto by clamping screws 25. Forwardly directed and vertically spaced wings 26 are carried by each supporting device and in vertically alined openings in these wings 26 a vertical bearing sleeve 27 is fixed. Each headlight 21 has connected to its lower portion a stud 28 which depends vertically from the headlight. Each stud 28 is received in its bearing sleeve 27 and is held against vertical displacement by means of a nut 29 threaded on the lower end of the stud 28. With this arrangement the headlights 21 are constrained to partake of the rotary motion of the tubular supporting shaft 18 and yet these headlights 21 are also turnable or rotatable about vertical axes and independent of the shaft 18.

An operating rod 30 is slidably mounted in the bushing 19 and extends through the shaft 18. The ends of the rod 30 project beyond the bushing 19.

Means is provided for moving the rod 30 in accordance with movements of the vehicle and preferably comprises a connecting rod 31 having one end coupled by a ball and socket joint 32 to one of the arms 13 of the supporting gear. The opposite end of the connecting rod 31 is adjustably connected, as at 32, to the operating rod 30. In this manner as the vehicle is steered to the right or left the operating rod 30 is correspondingly shifted.

Motion transmission mechanism is provided between each headlight 21 and the operating rod 30 so that the headlights 21 as well as the rod 30 will be moved in accordance with the supporting movement of the front wheels of the vehicle. These motion transmission mechanisms are of identical construction, and each includes a lug 35 fixed to a collar 36 secured on the operating rod 30. Each lug 35 slidably fits in a slot 37 provided therefor in the tubular supporting shaft 18 and the lug projects exteriorly of said shaft 18. Each lug is formed with a threaded opening 38 in which a bolt 39 is engaged. The bolt 39 is also engaged adjacent its head 40 with a seat 41 formed in an arm 42 secured to its headlight by an attaching plate 43. This attaching plate 43 is suitably fastened to the headlight casing and carries a socket 44 to facilitate the connection of the stud 28 to the headlight. The head of the bolt 40 engages the top of the arm 42 around the seat 41 and a washer 45 is fitted on the bolt and engages the underside of the arm 42 around the seat 41. A spring 46 encircles the bolt 39 and engages the washer 45 at one end and the lug 35 at its opposite end.

Manually controlled operating mechanism is provided for rotating the tubular supporting shaft from the dash board of the vehicle so that the inclination of the beams of light projected from the headlights 21 may be varied. With this arrangement the beams may be inclined toward the ground at a sharp angle or may be elevated to the desired degree. In order to carry out these purposes a crank arm 50 is secured to one of the bushings 19 by means of a pair of nuts 51. These nuts 51 together with a nut 52 provided on the other bushing 19 also serve as means for holding the shaft 18 against endwise movement. The crank arm 50 may be bent as shown to advantage in Figure 2 in order to conform to the contour of the apron 16 of the fender. The lower end of the crank arm 50 is connected to one end of a flexible wire 53 and the other end of the flexible wire 53 is connected to an operating rod 54 slidably fitted in a cylinder 55 secured to the dash board of the vehicle. The outer end of the operating arm 54 is provided with a handle 56 whereby the same may be conveniently manipulated. A pin 57 is fixed to the rod 54 and operates in a slot 58, one wall of which is provided with a series of inclined notches 59. The pin 57 is selectively engageable with the notches 59 to hold the rod 54 in adjusted position. Preferably a retractile coil spring 60 is provided, and has one end connected to the crank arm 50 and its opposite end connected to the frame member of the vehicle. The coil spring 60 is tensioned to swing the crank arm up against an elastic bumper 61 and the bumper 61 is so placed that the headlights 21 are properly inclined with respect to the ground and with respect to the vehicle. The flexible wire 53 is extended through a guide tubing 62 which may consist of flexible copper tubing suitably supported on the vehicle.

With this arrangement the headlights are caused to follow all of the steering movements of the front wheels of the vehicle and thus the beams of light are always properly directed and illuminate the earth over which the vehicle is to travel. These advantages are had and yet the headlights may be manually shifted to vary the inclination of the beams. Moreover by means of the improved and simplified construction the invention is adapted for use with automobiles of various types and the shaft 18 and bearing brackets 17 and associated parts serve to brace and strengthen the vehicle as well as to enhance the appearance of the vehicle.

The lug 35 and collar 36 may be cast as one piece and allowed to operate slidably on the rod 30, and this casting may be fastened to the rod 30 with a set screw 63.

I claim:

1. In a dirigible headlight, bearing brackets, a tubular supporting shaft rotatably mounted in said bearing brackets, means for holding said shaft against endwise movement, a rod slidably mounted in the tubular supporting shaft, a pair of headlights, supporting devices for mounting the headlights on the exterior of the tubular supporting shaft in such manner that the headlights partake of the movement of the supporting shaft and are also turnable relative to the supporting shaft about their vertical axes, motion transmission mechanism between the rod and each headlight for turning the headlights as the rod is moved, and means directly connected with the rod for moving said rod in accordance with the steering movement of the vehicle, and manually controlled operating mechanism directly connected with the tubular supporting shaft for rotating the tubular supporting shaft from the dashboard.

2. In a dirigible headlight, bearing brackets, a tubular supporting shaft mounted in said bearing brackets, a rod slidably mounted in the tubular supporting shaft, a pair of headlights, supporting devices for mounting the headlights on the exterior of the tubular supporting shaft in such manner that the headlights are turnable relative to the supporting shaft about their vertical axes, motion transmission mechanism between the rod and each headlight for turning the headlight as the rod is moved, and means directly connected with the rod for moving said rod in accordance with the steering movement of the vehicle.

3. In a dirigible headlight, bearing brackets, a tubular supporting shaft rotatably mounted in said bearing brackets, a rod slidably mounted in the tubular supporting shaft, supporting devices for mounting the headlights on the tubular supporting shaft having clamps engaged with the shaft, and bearing sleeves, said headlights having studs rotatably fitted in said bearing sleeves whereby the headlights are constrained to partake of the movement of the shaft and yet are turnable about their vertical axes relative to said shaft, motion transmission mechanism between the rod and each headlight for turning the headlight as the rod is moved, means for moving said rod in accordance with the steering movement of the vehicle and manually controlled operating mechanism for rotating the tubular supporting shaft from the dash board of the vehicle, said manually controlled operating mechanism including a crank arm fixed to the shaft, an elastic bumper for said crank arm, and a spring for yieldingly holding the crank arm against said bumper.

4. In a dirigible headlight, bearing brackets, a tubular supporting shaft rotatably mounted in said bearing brackets, a rod slidably mounted in the tubular supporting shaft, supporting devices for mounting the headlights on the exterior of the tubular supporting shaft having clamps engaged with the outer periphery of the shaft and bearing sleeves, said headlights having studs rotatably fitted in said bearing sleeves whereby the headlights are constrained to partake of the movement of the shaft and yet are turnable about their vertical axes relative to said shaft, motion transmission mechanism between the rod and each headlight for turning the headlight as the rod is moved, means directly connected with the rod for moving said rod in accordance with the steering movement of the vehicle and manually controlled operating mechanism directly connected with the tubular supporting shaft for rotating the tubular supporting shaft from the dash board of the vehicle.

ALVIE C. WOODRUFF.